United States Patent [19]

Taeusch et al.

[11] Patent Number: 4,857,696
[45] Date of Patent: Aug. 15, 1989

[54] LASER/EDM DRILLING MANUFACTURING CELL

[75] Inventors: David R. Taeusch, Ypsilanti, Mich.; Clinton J. Wohlmuth, Columbus, Ind.

[73] Assignee: Raycon Textron Inc., Ann Arbor, Mich.

[21] Appl. No.: 185,128

[22] Filed: Apr. 22, 1988

Related U.S. Application Data

[63] Continuation of Ser. No. 60,826, Jun. 12, 1987, abandoned.

[51] Int. Cl.$^4$ .............................................. B23K 26/00
[52] U.S. Cl. ............................. 219/121.7; 219/121.71; 219/69.17
[58] Field of Search .......... 219/121.7, 121.71, 121.67, 219/121.72, 69 M, 69 B; 204/129.3, 129.55

[56] References Cited

U.S. PATENT DOCUMENTS

| | | | |
|---|---|---|---|
| 3,696,504 | 10/1972 | Cupler, II | 219/121.61 X |
| 3,816,272 | 6/1974 | Joslin | 204/129.1 |
| 4,504,727 | 3/1985 | Melcher et al. | 219/121.62 |
| 4,786,777 | 11/1988 | Rupert | 219/121.74 X |

Primary Examiner—C. L. Albritton
Attorney, Agent, or Firm—John C. Evans

[57] ABSTRACT

A process and apparatus for drilling precision small diameter holes in fuel nozzle parts includes the process of directing a laser beam against the nozzle part at a first hole drilling station to form an undersized hole therethrough and thereafter positioning the nozzle part with the laser hole formed therethrough in alignment with a wire electrode of an electrical discharge machine and controlling the energy input to the electrode wire and advancing it with respect to the preformed laser hole so as to form a precision hole diameter and surface finish throughout the length of the laser beam formed hole as EDM particles are flushed through a flow path defined by the laser hole from one face to the opposite face of a part wall.

10 Claims, 2 Drawing Sheets

LASER/EDM DRILLING MANUFACTURING CELL

This is a continuation, of application Ser. No. 060,826, filed on June 12, 1987, Abandoned.

TECHNICAL FIELD

The present invention relates generally to precision drilling systems, and more particularly, to a combined laser and electrical discharge machining cell for forming precision small diameter holes in nozzle parts.

BACKGROUND ART

U.S. Pat. No. 4,504,727 sets forth a laser drilling system which utilizes photoacoustic feedback to monitor and control the laser beam so as to control a laser drilling process. In the -727 patent, the drilling process is provided to produce an array of holes in a multilayered printed circuit board. In such arrangements, it is necessary to closely control the pulse power of a laser so that it can be adjusted for each successive layer in such structures. There is no suggestion in the -727 patent that the laser formed hole be later precision finished to a close tolerance suitable for use in precision small diameter holes in nozzle parts for fuel injection systems or the like.

U.S. Pat. No. 3,696,504, issued Oct. 10, 1972, discloses a process wherein a laser beam is used to form a hole through a part. In the case of metal parts, it is recognized that such laser formed holes can effect the metallurgy of the parts. In accordance with the process of the -504 patent, the altered metallurgy of the laser formed hole is subsequently machined away by a mechanical tool having a blade which reams the wall of the laser formed hole.

When drilling precision small diameter holes for diesel engine fuel system nozzles, it is critical that the spray holes formed in the nozzle have precise diameters and a smooth internal microfinish to produce desired flow rates and angle accuracy of fuel discharge into engine combustion chambers.

In the present invention, undersized holes are first formed by a laser to reduce the cycle time for penetration of the hole through the part. The part is then finished by electrical discharge machining. Specifically, a wire electrode of an electrical discharge machine is advanced through the previously laser formed undersized hole which is sized to provide an annular flow path for unidirectional flow of electrolyte during an EDM process. The flow path is sized so that particles produced during the EDM process will be flushed from the part by the unidirectional flow of electrolyte. The wire electrode is sized and is connected to a pulse generator to control energy at a spark gap between the wire electrode and a grounded workpiece so as to form a hole of precision dimension and with a microfinished surface thereon. The use of a laser to form a rough undersized hole, followed by a precision finishing of the laser hole by electrically discharge machining the inner surface thereof reduces the total hole forming cycle time as compared to the cycle time of prior computer controlled EDM hole drilling equipment. Furthermore, the combination of laser drilling of undersized holes and EDM finishing enables nozzle parts to be produced at high production rates while maintaining hole size precision and finish.

SUMMARY OF THE INVENTION

The manufacturing cell of this invention has platform means for locating nozzle parts for programmed, sequentially accurate part transfer between a laser drilling station and an EDM finishing station. The laser drilling station includes a laser head; a microprocessor control and a beam delivery system. A CNC controlled multi-axis drive will accurately locate the indexing table to produce a variety of holes in a nozzle part when it is indexed with respect to the laser drilling station and EDM station. The cell includes a shield station with a plunger formed from polytetrafluoroethylene (PTFE) and retracting feeder mechanism to shield the inside surface of the nozzle part during the impingement of the laser beam thereon to form an undersized hole therethrough which creates a path for flow of EDM electrolyte and a path to flush particles from the part during EDM precision finishing of the laser hole. The PTFE plunger and retractor feed mechanism are removed from the nozzle part and the part is precision indexed to the EDM station where a wire electrode is used to finish the undersized laser hole. An adaptive control power supply selectively applies an electrical discharge machining current across a gap between the wire electrode and the wall of the laser hole. The EDM controller advances the wire electrode with respect to the laser hole as EDMed particles are flushed therethrough so as to form a precision hole having a right cylindrical configuration and a microfinish on the inner surface of the laser hole. The aforedescribed dual drilling process reduces the hole drill and finish cycle time. The process improves hole diameter and cylinder shape precision and also improves smoothness of internal hole surfaces so as to assure closely controlled flow rates and angle accuracy of fuel exiting from such fuel nozzles.

The main object of the invention is to produce a hole in a fuel nozzle part by the use of dual drilling steps including a first laser beam hole drilling step and precision EDM drilling of the laser hole to accurately size and finish the inside surfaces of an undersized laser formed hole to produce a resultant hole with a precise cylindrical configuration thereby to improve flow rate and flow exit patterns of fluid flow therethrough.

Another object of the present invention is to provide such a dual laser/EDM process for precision nozzle hole formation wherein the undersized laser drilled hole therethrough is preformed to define a hole for receiving an EDM electrode and to define a path for flushing EDM particles from the part without flow reversal of the electrolyte and the erosion particles carried thereby.

Other objects, features and advantages of the present invention will become more apparent from the following description take in conjunction with the accompanying drawings.

DETAILED DESCRIPTION OF THE INVENTION

Figure 2:
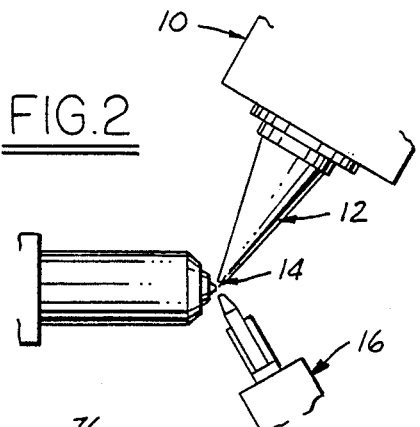
FIG. 2 is an enlarged view of a fuel nozzle tip shown in alignment with laser and EDM heads.
Figure 1:
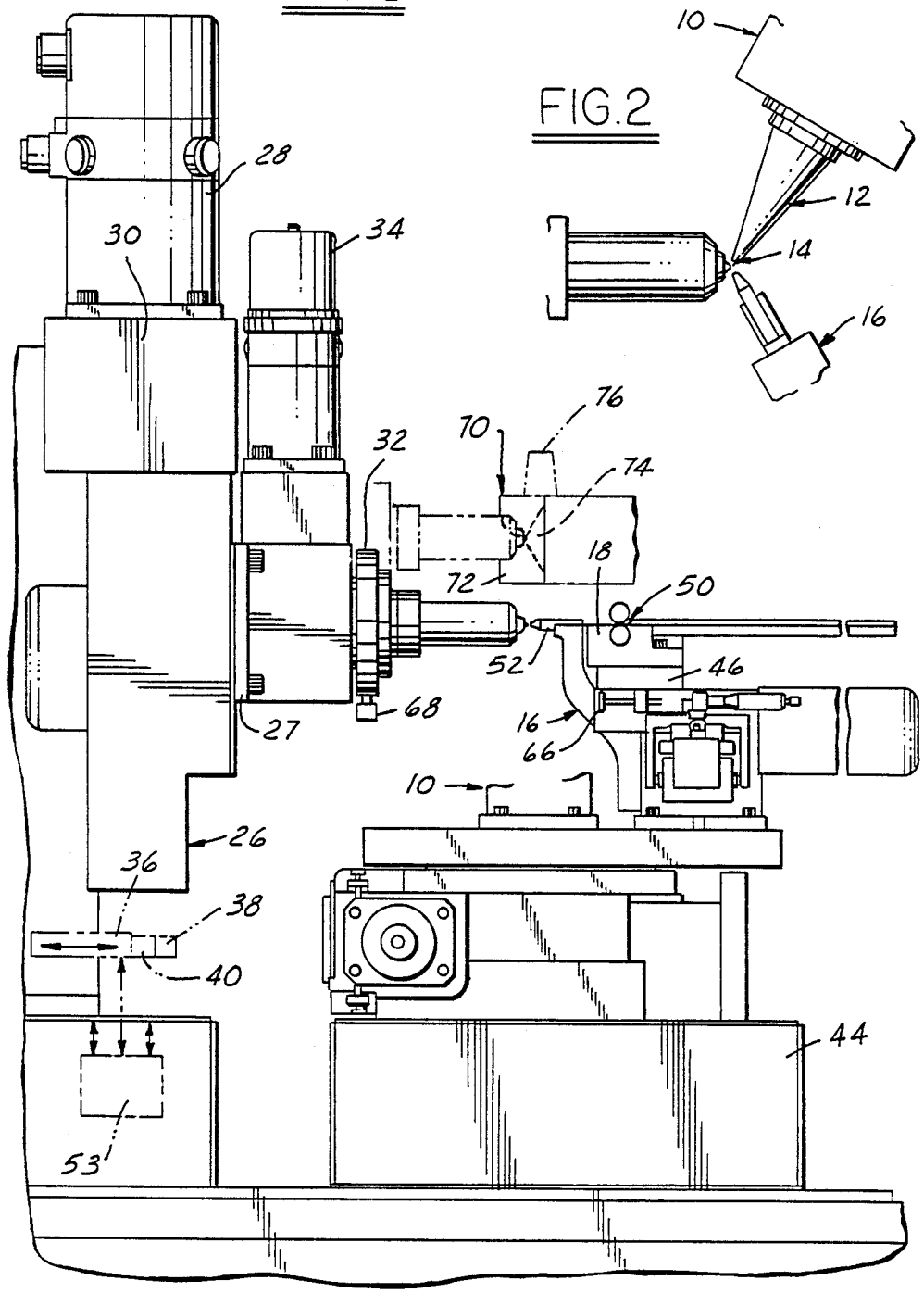
FIG. 1 is an elevational view of a combination laser and EDM hole drilling manufacturing cell of the present invention.

Referring now to FIG. 1, a laser hole drilling station 10 is illustrated. It includes a laser head 12 for producing a laser output beam 14. Station 10 is angularly offset with respect to an EDM hole drilling station 16 having an EDM head 18.

Figure 5:
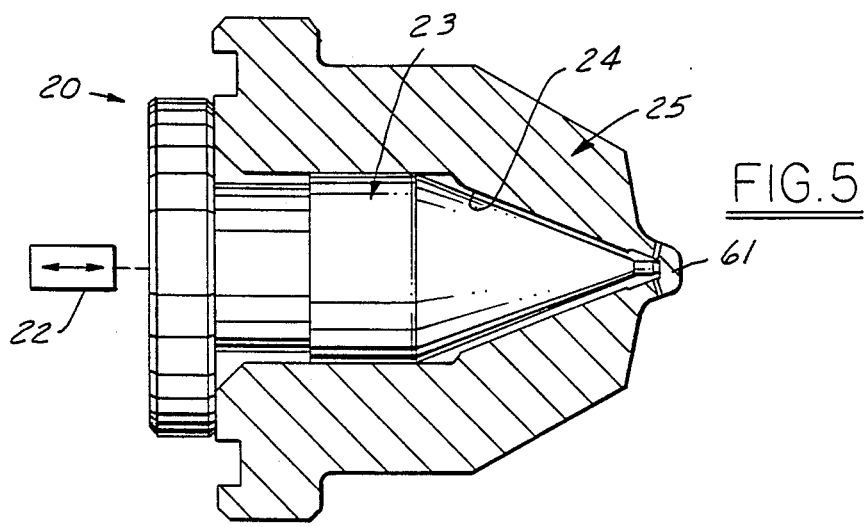
FIG. 5 is an elevational view of an insert for shielding a nozzle part during the laser hole drilling step of the method of the present invention.

FIG. 5 shows a shield station 20 including a plunger feed and retracting mechanism 22 which positions a protective plunger insert 23 configured to cover the interior surface 24 of a nozzle workpiece 25 to shield it when a laser beam breaks through the workpiece wall during a laser drilling step to be described. The nozzle workpiece 25 is illustrative of the type of precision fluid flow device whose performance can be enhanced by practicing the method of the present invention. The invention is equally suitable for use in the manufacture of other devices or parts which require precisely shaped hole configurations formed therethrough.

In the machine cell of FIG. 1, the nozzle workpiece is supported by an indexing platform 26 for movement with respect to the various work stations. The indexing platform 26 more particularly includes a carriage 27 connected to a drive motor 28 and suitable drive gear means 30 to drive carriage 27 into a plurality of vertically displaced locations to locate the nozzle workpiece 25 at the work stations. The workpiece 25 is located on a rotatable plate 32 on the platform 26. The plate 32 is driven by an actuator 34 to position it in a plurality of hole forming indexed positions. Cross-slide 36 supports the platform 26. It is driven by motor 38 and drive gear 40 to position the workpiece 25 at the laser head 12 and the EDM head 18.

The EDM drilling station 16 includes a base 44 with a carriage 46 for feeding a wire electrode 48 for finish machining undersized laser drilled holes in the nozzle during a precision machining operation of the hole drilling system 10. Specifically, the wire electrode passes through a refeed mechanism 50 and a wire guide 52 to the nozzle workpiece 24. The refeed mechanism 50 is adapted to advance the electrode wire relative to the carriage 46 upon retraction of the carriage after each machining operation.

An operating sequence of the cell includes moving the carriage 27 to the laser hole drilling station 12 and to the EDM hole drilling station 16. The machine is controlled by a CNC controller 53 at each such station to position the nozzle workpiece 25 in a preprogrammed sequence at each station to form a desired series of precision microfinished holes therein.

Figure 3:
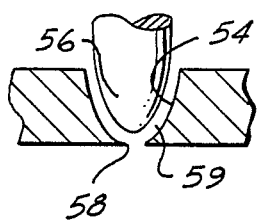
FIG. 3 is a sectional view of a prior art nozzle having the hole formed therein solely by use of an EDM electrode and electrical discharge machining processing.

FIG. 3 shows the shape of a nozzle hole formed solely by use of an EDM hole drilling process. During such a process a wire electrode connected to a suitable power generator of the type set forth in U.S. Pat. No. 4,361,745 issued Nov. 30, 1982 to Rupert et al for Process Control for Electrical Discharge Machining Apparatus is advanced with respect to a workpiece to cause a somewhat conoidally shaped hole 54 to be formed until the electrode breaks through the part wall. During the electrical discharge machining of the hole, the electrode is eroded to have a tapered end 56 and at the end of the hole formation stroke the tapered end 56 will produce a breakout edge 58 that will require a further stroke of the electrode to complete the hole. Furthermore, before the electrode end 56 breaks through the part wall, the electrolyte reverse flows around the electrode. Consequently, particles which are eroded from the part by the electrode are backflushed from the part through the spark gap region 59. Such a reverse flow pattern of eroded particles can cause the walls of the holes to be formed slightly off-center and result in a hole that is not of a precise right cylindrical configuration.

Figure 4A:
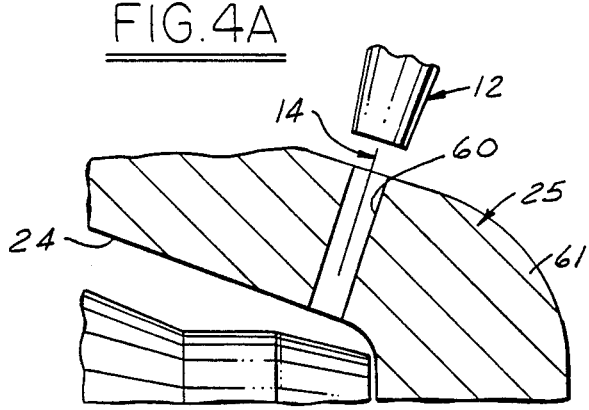
FIGS. 4A–4C are enlarged fragmentary perspective views of a part drilled by a combination laser and EDM process.
Figure 4C:
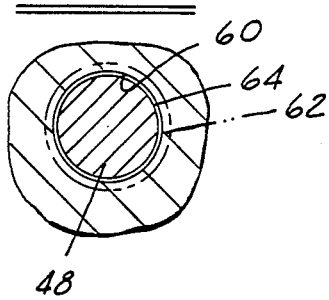
Figure 4B:
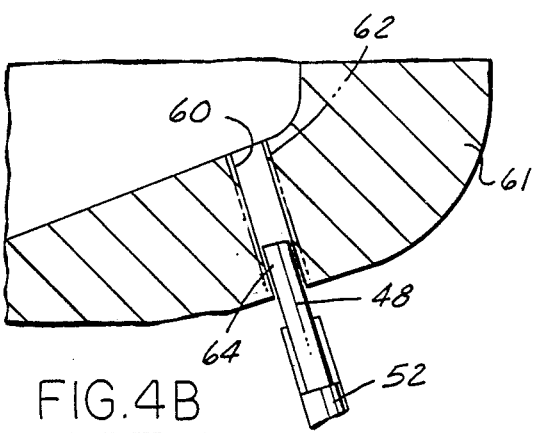

In the present invention, such problems are obviated. Hence, as shown in FIGS. 4A-4C, the workpiece 25 is positioned so that its tip 61 is aligned with the output beam 14 from the laser head 12. The laser is a Nd-YAG laser which is of the type set forth in U.S. Ser. No. 621,342 filed June 18, 1984 and owned by the present assignee.

The laser head 12 is pulsed at a power output level which will produce an undersized laser hole 60 in the nozzle tip 61. In order to meet the final desired nozzle hole specifications, a wall thickness 62 must be removed. Such removal is accomplished by steps including indexing the laser hole into alignment with the EDM hole drilling station 16. The electrode 48 is then advanced into the hole 60. As illustrated in FIG. 4B, the electrode diameter is selected to define a spark gap to erode the wall thickness 62. The diameter is further selected so as to define an annular electrolyte flow path 64 through which the electrolyte flows in a unidirectional path without flow reversal during the EDM erosion process. As a consequence, erosion particles from the part are carried away from the advancing electrode at the spark gap formed between the electrode tip and the nozzle. The preformed laser hole 60 thereby serves to define a lead-in path which will prevent or substantially reduce the end taper on the electrode as it advances through the hole. Further, flushed erosion products will not interfere with the hole formation process. The result is a truly accurately formed right cylindrical hole shape. Such hole shapes will result in desired flow metering characteristics. Further, they will produce more predictable flow exit patterns from nozzles made by use of the method of the present invention.

After each EDM operation, the downward limit of the carriage 46 is sensed by a limit switch 66 which causes plate 32 to be indexed to place the next laser drilled hole at the EDM work station where the wire is directed form the wire guide 52. When the plate 32 is indexed to the position for machining the last laser drilled hole in the nozzle workpiece 25, a limit switch 68 conditions the machine to actuate the drive motors 28, 30 to transfer the nozzle 25 to a flow test station 70. The test station or flow test station 70 includes a stand 72 having a nest 74 therein to receive the nozzle workpiece 25. An air gauge test head 76 is located in overlying relationship to the stand 72 and is adapted to operatively engage the nozzle 25 to measure the air flow capacity thereof. After the testing operation is completed, the nozzle workpiece 25 is transferred from the flow test station 70 to a part unloading station where the part is either accepted or rejected by a known selection process which is based upon the flow result that is obtained at the flow test station 70. Representative flow testing stations and sorting stations for accomplishing such selection of desired workpieces are set forth in copending United States Application 781,115 entitled, "Method and Apparatus for Electric Discharge Machining", owned by the present assignee.

Although the description of this invention has been given with reference to a particular embodiment, it is not to be construed in a limiting sense. Many variations and modifications will be apparent to those skilled in the art. For a definition of the invention, reference is made to the appended claims.

What is claimed is:

1. In a dual drilling process for forming a finished precision hole through a part having a wall with an inside surface defining an internal cavity, the improvement comprising:

high speed laser drilling the wall by focusing a beam of laser energy on an imperforate segment of the wall to form an undersized hole of irregular form through the wall from the exterior thereof to the internal cavity while maintaining the internal cavity under ambient pressure conditions;

shielding the surface of the internal cavity to prevent erosion thereof during the laser drilling step;

removing the shielding and sequentially aligning an electrode with respect to the undersized hole and applying current between the electrode and the wall of the undersized hole to spark erode a predetermined thickness of the wall at the previously laser formed undersized hole to shape the irregularly formed undersized hole as a right cylindrical passage from the interior surface to the exterior surface of the wall.

2. In apparatus for drilling precision small diameter holes in a part having a wall and an interior cavity bounded by the wall, the improvement comprising:

machine base means;

laser means and electrical discharge machining means on said machine base means;

means for locating the wall sequentially first with respect to said laser means and then with respect to said electrical discharge machining means;

means for controlling said laser means to focus a beam of laser energy on an imperforate segment of the wall part to form an undersized hole of irregular form through the wall from the exterior thereof to the internal cavity while maintaining the internal cavity under ambient pressure conditions;

means for shielding the surface of the internal cavity to prevent erosion thereof during the laser drilling step; and means for removing the shielding and sequentially aligning an electrode with respect to the undersized hole and applying current between the electrode and the wall of the undersized hole to spark erode a predetermined thickness of the wall at the previously laser formed undersized hole to shape the irregularly formed undersized hole as a right cylindrical passage from the interior surface to the exterior surface of the wall.

3. In the process of claim 2, electrical spark machining the undersized hole by the steps of selecting an electrode of right circular cross-section of a diameter less than the undersized hole and of a length greater than that of the undersized hole and progressively feeding the electrode from the exterior end of the undersized hole to the interior end thereof while applying current between the electrode and the wall to progressively shape the irregularly formed hole as a right cylindrical passage from the exterior surface to the interior surface of the wall.

4. In the process of claim 3, selecting an annular space between the electrode and the wall of the undersized hole dimensioned to define a continuously progressively advancing annular axial passage from the exterior surface to the interior surface of the wall for uniformly constant flow of electrolyte through the wall for flushing spark erosion particles from the irregularly formed undersized hole as the electrode progressively advances therein so as to produce a precise right cylindrical passage through the wall.

5. In the apparatus of claim 2, said laser means including a laser head and said electrical discharge means including a wire feed head; said laser head and said wire feed head being located in a common plane and being angularly spaced with respect to one another.

6. In the process of claim 1, progressively feeding a wire electrode having a diameter less than that of the undersized hole through the undersized hole for shaping the irregular form thereof to a constant diameter right cylindrical passage from the exterior surface to the interior surface of the wall.

7. In a dual drilling process for forming a finished precision hole through a part having a wall with an inside surface defining an internal cavity, the improvement comprising:

high speed laser drilling the wall by focusing a beam of laser energy on an imperforate segment of the wall to form an undersized hole of irregular form through the wall from the exterior thereof to the internal cavity while maintaining the internal cavity under ambient pressure conditions;

shielding the surface of the internal cavity to prevent erosion thereof during the laser drilling step;

removing the shielding and sequentially aligning an electrode with respect to the undersized hole and applying current between the electrode and the wall of the undersized hole to spark erode a predetermined thickness of the wall at the previously laser formed undersized hole to shape the irregularly formed undersized hole as a precision hole from the interior surface to the exterior surface of the wall.

8. In apparatus for drilling precision small diameter holes in a part having a wall and an interior cavity bounded by the wall, the improvement comprising:

machine base means;

laser means and electrical discharge machining means on said machine base means;

means for locating the wall sequentially first with respect to said laser means and then with respect to said electrical discharge machining means;

means for controlling said laser means to focus a beam of laser energy on an imperforate segment of the wall part to form an undersized hole of irregular form through the wall from the exterior thereof to the internal cavity while maintaining the internal cavity under ambient pressure conditions;

means for shielding the surface of the internal cavity to prevent erosion thereof during the laser drilling step; and means for removing the shielding and sequentially aligning an electrode tip with respect to the undersized hole and applying current between the electrode and the wall of the undersized hole to spark erode a predetermined thickness of the wall at the previously laser formed undersized hole to shape the irregularly formed undersized hole as a precision hole from the interior surface to the exterior surface of the wall.

9. In a dual drilling process for forming a finished precision hole through a wall with an imperforate segment and two surfaces, the improvement comprising:

high speed laser drilling the wall by focusing a beam of laser energy on the imperforate segment of the wall to form an undersized hole of irregular form through the wall while maintaining the wall surfaces under ambient pressure conditions;

aligning an electrode tip with respect to the undersized hole following laser drilling thereof and applying current between the electrode tip and the wall at the undersized hole and advancing the electrode toward the wall to spark erode a predetermined thickness of the wall at the previously laser formed undersized hole to shape the irregularly formed undersized hole as a precision hole through the wall.

10. In apparatus for drilling precision small diameter holes in a part having a wall with two surface, the improvement comprising:

machine base means;

laser means and electrical discharge machining means on said machine base means;

means for locating the wall sequentially first with respect to said laser means and then with respect to said electrical discharge machining means;

means for controlling said laser means to focus a beam of laser energy on an imperforate segment of the wall part to form an undersized hole of irregular form through the wall while maintaining the two surfaces of the wall at ambient pressure conditions;

an electrode in said electrical discharge machining means;

means for sequentially aligning said electrode with respect to the undersized hole and applying current between the electrode and the wall at the undersized hole to spark erode a predetermined portion of the wall at the previously laser formed undersized hole therein to shape the irregularly formed undersized hole as a precision hole through the wall.

* * * * *